Aug. 18, 1953

C. M. ZAJDEL 2,648,909

LENGTH MEASURING UNIT FOR WORK IN
LATHES AND SCREW MACHINES

Filed Dec. 12, 1950

INVENTOR:
Casimir M. Zajdel

BY
Milo B. Stevens & Co.
Attorneys.

UNITED STATES PATENT OFFICE 2,648,909

LENGTH MEASURING UNIT FOR WORK IN LATHES AND SCREW MACHINES

Casimir M. Zajdel, Chicago, Ill.

Application December 12, 1950, Serial No. 200,397

4 Claims. (Cl. 33—170)

My invention relates to means for measuring and adjusting the length of work in hand-screw lathes, turret lathes and automatic screw machines, and comprises a unit designed to be mounted in the regular tool support of the machine for adjustment in respect to the work.

One object of the invention is to provide a unit of the above character which makes possible a highly accurate measurement of the work.

A further object is to incorporate means in the novel unit for securing a micrometer measurement to fine limits almost instantly.

Another object is to incorporate means in the novel unit for positively locking the same at any point of measuring adjustment, whereby to maintain such adjustment in fixed position.

An additional object is to construct the unit with means for withstanding end and radial thrusts occasioned by the application of the work.

An important object is to employ a high degree of accuracy in the assembling and operation of the unit, in order that it may serve as a precision instrument.

A still further object is to employ comparatively few and simple parts in the novel unit, whereby to render its manufacture economical.

With the above objects in view, and any others which may suggest themselves from the description to follow, a better understanding of the invention may be had by reference to the accompanying drawing, in which—

Figure 1:
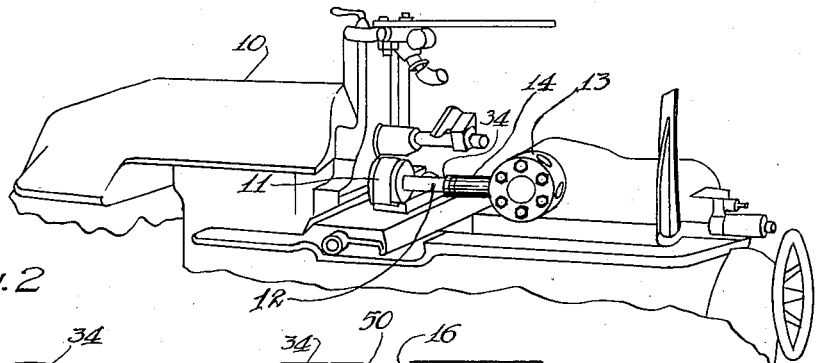
Fig. 1 is a perspective view of a fragment of an automatic screw machine, showing the novel measuring unit mounted in the turret-type tool holder.
Figure 2:
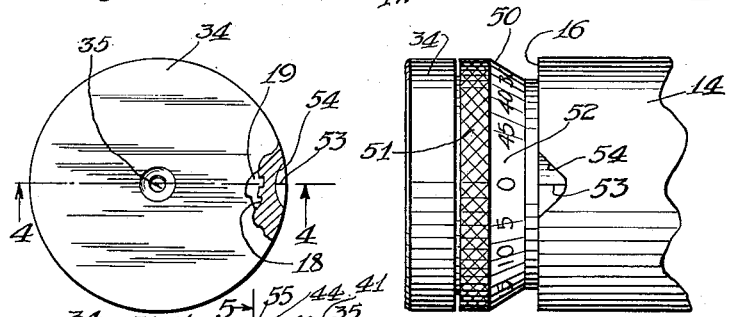
Fig. 2 is an enlarged elevation of the front end portion of the unit, partly broken away.
Figure 3:
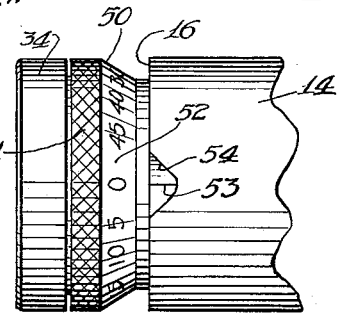
Fig. 3 is a right-hand side view of the showing in Fig. 2.

In accordance with the foregoing, specific reference to the drawing indicates a typical turret lathe at 10, its rotary work holder at 11, the work carried by the same at 12, a turret-type tool holder at 13, and the novel measuring unit at 14, the latter being mounted in the tool holder 13 opposite the work.

The measuring unit 14 is largely in the form of an elongated cylindrical shank, one end portion 15 of which is solid and carried in the tool holder 13. The other end portion of the shank projects forwardly from the tool holder and terminates with a frontal end-face 16 which contains a large circular cavity 17 whose side wall has an annular formation of splines 18.

The floor 19 of the frontal cavity 17 is chambered with an axial bore 20 having a rear-end shoulder 21 from which the bore continues with a tapped bore 22 of slightly less diameter, the bore 22 ending with a pocket 23 in the center of the shank 14.

The shank 14 forms a receptacle for an axially positioned center tube 25, such tube having its rear portion formed as a screw 26 which is closely threaded in the tapped bore 22 of the shank 14. The medial portion 27 of the tube 25 makes a snug sliding and rotary fit in the bore 20 of the shank, and has an end-shoulder 28 in longitudinally-spaced relation to the forward end of the screw 26.

The forward portion of the tube 25 is enlarged outwardly to form a cup 30 located in the frontal cavity 17 of the shank 14; and the cup terminates with a flared frontal portion 31 which forms the rear race for a ball bearing 32. The companion race in front of the latter is formed by the reduced rear portion 33 of a circular disc 34 which forms the frontal stop element for the work 12. The disc 34 carries the tightly-fitted frontal portion of an axial shaft 35 passing through the tube 25; and the rear end of the latter receives a bushing 36 to journal the shaft in the shank 14, the shaft carrying a spring clip 37 as a retainer for the bushing. It is now apparent that, while the rear end portion of the unit formed by the shaft 35 and the disc 34 is supported in the rear end of the tube 25 as just described, the front end portion of such unit is supported first—by means of the ball bearing 32—in the cup 30 of the tube, which is in turn supported by the close rotary fit of the medial portion 27 of the tube in the bore 20 of the shank 14. Further, the retainer 37 and bushing 36 at the rear of the shaft 35 lock the stop disc 34 in endwise engagement with the tube 25 through the agency of the ball bearing 32.

Figure 4:
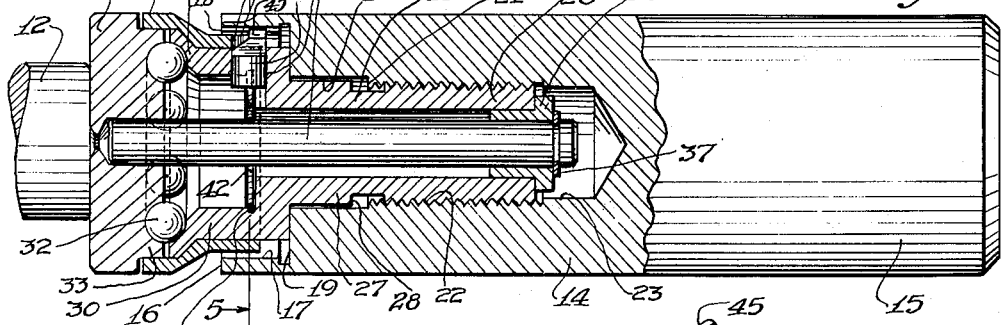
Fig. 4 is a section on the line 4—4 of Fig. 2.
Figure 6:
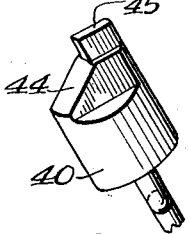
Fig. 6 is a perspective view of a locking element.
Figure 5:
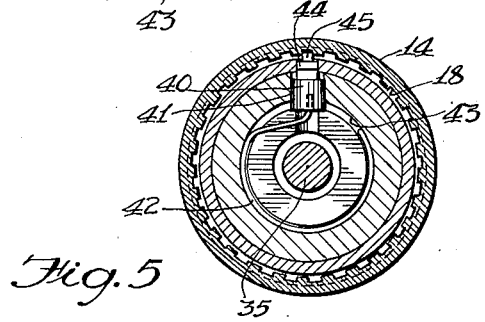
Fig. 5 is a section on the line 5—5 of Fig. 4.

The free rotary mounting of the stop disc 34 in relation to the unit shank 14 enables the work 12 to be applied to the measuring unit—while in rotation—by direct engagement with the stop disc 34 as shown in Figs. 1 and 4. In this manner the cup 30 behind the disc is not only relieved of friction from the work, but also secures direct endwise engagement with the same through the agency of the disc. The cup could therefore be rotated to feed it longitudinally—with the disc as a unit—toward or away from the work, and the extent of the feed used as a measurement of the desired length or end limits of the work.

Normally, the cup 30 is locked from rotation relative to the shank 14. The means for this purpose is a pin 40 slidable in a radial bore 41 made in the side wall of the cup 30. The pin is urged outwardly by a scroll-type spring 42 lodged in an annular groove 43 made in the wall of the cup 30 adjacent the bottom thereof. One end of the spring is driven into the inner end of the pin 40 and urges the latter as stated. The outer end of the pin is reduced to form a bevel-type cam 44 terminating with a tooth 45 which lodges in one of the shank splines 18, locking the cup from rotary motion relative to the shank.

It is of course possible to free the cup 30 for rotation by backing the pin 40 clear of the splines 18, and a simple device to do this will now be described. The device is in the form of a conical sleeve 50 shaped to seat the cup 30. The frontal portion of the sleeve bridges the space between the cup and the disc 34 and overlaps the reduction 33 of the latter; and such frontal portion of the sleeve is knurled on the outside, as indicated at 51.

The outside of the medial portion of the sleeve 50 is graduated with a numerical scale 52 readable relative to an origin line 53 marked in a surface cavity 54 made in the corresponding end of the unit shank 14; and the inner end of the sleeve is formed with a longitudinal slot 55 which freely engages the sides of the pin cam 44, which are parallel. While the normal position of the sleeve 50 is indicated in Fig. 4, the sleeve is designed to be drawn rearwardly when it is desired to release the cup 30 for rotation. The rearward movement of the sleeve causes the bottom of the slot 55 to impinge on the bevel of the pin cam 44 with a retracting effect on the pin, so that the tooth 45 backs into the slot 55 to amply clear the shank splines 18. Now the sleeve may be rotated to feed the stop disc 34 endwise as desired; and the adjustment of the sleeve is in the nature of a micrometer, enabling the stop disk to be adjusted to fine limits. When a desired adjustment has been secured, it is a simple matter to fix it by returning the sleeve 50 to its forward position, this action releasing the locking pin 40 for engagement with the spline opposite the same in order to fix the cup 30 as stated.

It will now be apparent that the novel measuring unit has a number of advantageous features. First, it employs a freely rotatable stop element for endwise engagement by the work while the latter is in rotation, eliminating the need of stopping the work for endwise measurement. Further, a measuring feed is had which works with the stop element as a unit for purposes of longitudinal adjustment. Further, impact or shock imparted to the stop element is absorbed and distributed by the ball bearing, relieving the screw feed of thrusts causing wear and eventual looseness. Further, the screw feed is readable and adjustable on the surface of the measuring unit in terms of micrometer precision. Further, while the screw feed may be locked at any point of adjustment, the micrometer reading element is quickly operable both to release the screw feed and to operate it for measuring the work. Further, the length of the splines 18 permits locking engagement with them by the pin tooth 45 within the relatively short travel range of the screw feed necessary for end measurements. Further, the locking pin and its spring, being mounted inside the device, are amply protected from injury by external objects; and the pin has the additional function of a stop to prevent the sleeve 50 from backing off the cup 30 in case the screw feed is advanced to excess. But such advance may be continued, if desired, to take the unit apart in case of inspection or repair. Further, the unit is constructed so compactly that it conveniently fits turret or other types of tool holders. Finally, the novel measuring unit is a time saver by enabling length adjustments to be made quickly and with a high degree of accuracy; and in the latter respect the unit is economical by eliminating mistakes and the scrapping of material due to the same.

I claim:

1. A length measuring unit including a shank, a feed element carried by the same, said feed element being threaded in the shank as a feed screw alined axially with the work, and a device to lock the rotation of the feed screw in relation to the shank, such device comprising an annular series of receptacles formed in the shank, and a stop pin movable radially in the feed screw to seat in any one of said receptacles when the feed screw has been rotated to a desired point of adjustment.

2. A length measuring unit including a shank, a feed element carried by the same, said feed element being threaded in the shank as a feed screw alined axially with the work, and a device to lock the rotation of the feed screw in relation to the shank, such device comprising an annular series of internal longitudinal splines formed in the shank, and a stop pin movable radially in the feed screw to seat in any one of said splines when the feed screw has been rotated to a desired point and within the working longitudinal range of adjustment.

3. A length measuring unit for work in lathes, screw machines and the like comprising a shank adapted to be carried by the tool holder of the lathe or like machine opposite the free end of the work, a feed element carried by the shank and adjustable relative to said free end, and a stop element carried by the feed element for engagement by the said free end, such stop element being freely rotatable by the work in the event of such engagement, said feed element having an enlargement of circular cross-section opposite the stop element and being threaded in the shank as a feed screw alined axially with the work, an annular series of receptacles formed in the shank, a stop pin movable radially in the feed screw to seat in any one of said receptacles when the feed screw has been rotated to a desired point of adjustment, a cam carried by the stop pin, and a sleeve encircling said enlargement and slidable endwise to crowd the cam in the pin-backing direction and release the feed screw for rotation.

4. A length measuring unit for work in lathes, screw machines and the like comprising a shank adapted to be carried by the tool holder of the lathe or like machine opposite the free end of the work, a feed element carried by the shank and adjustable relative to said free end, and a stop element carried by the feed element for engagement by the said free end, such stop element being freely rotatable by the work in the event of such engagement, said feed element having an enlargement of circular cross-section opposite the stop element and being threaded in the shank as a feed screw alined axially with the work, an annular series of receptacles formed in the shank, a stop pin movable radially in the feed screw to seat in any one of said receptacles when the feed screw has been rotated to a desired point of adjustment, a bevel-type cam with parallel sides carried by the stop pin, and a sleeve encircling said enlargement and formed with a longitudinal slot in the end facing the cam, such sleeve being slidable to receive the cam in the slot until the bottom of the same meets the cam as a stop limit for the sleeve movement, and said bottom being effective on the continued movement of the sleeve to crowd the cam in the pin-backing direction and release the feed screw for rotation.

CASIMIR M. ZAJDEL.

References Cited in the file of this patent

UNITED STATES PATENTS

| Number | Name | Date |
| --- | --- | --- |
| 1,257,998 | Gruber | Mar. 5, 1918 |
| 1,348,875 | Hastings | Aug. 10, 1920 |
| 2,349,159 | Freeman | May 16, 1944 |

FOREIGN PATENTS

| Number | Country | Date |
| --- | --- | --- |
| 377,809 | Italy | Jan. 9, 1940 |